(12) United States Patent
Nowak et al.

(10) Patent No.: US 10,822,515 B2
(45) Date of Patent: Nov. 3, 2020

(54) COMPOSITES TRANSMISSIVE TO VISUAL AND INFRARED RADIATION AND COMPOSITIONS AND METHODS FOR MAKING THE COMPOSITES

(71) Applicant: The Boeing Company, Chicago, IL (US)

(72) Inventors: Andrew P. Nowak, Los Angeles, CA (US); April R. Rodriguez, Marina Del Ray, CA (US); Erin E. Stache, Glendale, CA (US); Russell P. Mott, Calabasas, CA (US); Adam F. Gross, Santa Monica, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/219,600

(22) Filed: Dec. 13, 2018

(65) Prior Publication Data
US 2020/0140717 A1    May 7, 2020

Related U.S. Application Data

(62) Division of application No. 14/807,874, filed on Jul. 23, 2015, now Pat. No. 10,208,226.

(51) Int. Cl.
| | |
|---|---|
| *C09D 145/00* | (2006.01) |
| *C08K 9/04* | (2006.01) |
| *B29C 39/00* | (2006.01) |
| *B29C 39/38* | (2006.01) |
| *G02B 1/04* | (2006.01) |
| *C08J 5/18* | (2006.01) |
| *C08J 7/04* | (2020.01) |
| *B29C 70/58* | (2006.01) |
| *C08K 3/16* | (2006.01) |
| *B29K 105/00* | (2006.01) |
| *B29K 105/16* | (2006.01) |
| *B29K 23/00* | (2006.01) |
| *B29K 509/00* | (2006.01) |

(52) U.S. Cl.
CPC .......... *C09D 145/00* (2013.01); *B29C 39/006* (2013.01); *B29C 39/38* (2013.01); *B29C 70/58* (2013.01); *C08J 5/18* (2013.01); *C08J 7/042* (2013.01); *C08K 9/04* (2013.01); *G02B 1/04* (2013.01); *B29K 2023/00* (2013.01); *B29K 2105/0085* (2013.01); *B29K 2105/16* (2013.01); *B29K 2509/00* (2013.01); *B29K 2995/0018* (2013.01); *C08J 2323/20* (2013.01); *C08J 2367/02* (2013.01); *C08J 2369/00* (2013.01); *C08J 2423/20* (2013.01); *C08K 2003/162* (2013.01); *C08K 2201/005* (2013.01); *C08K 2201/011* (2013.01)

(58) Field of Classification Search
CPC ...... C09D 123/16; C09D 145/00; C08K 9/04; B29C 39/00; B29C 70/58; B29C 39/38; G02B 1/04; C08J 5/18; C08J 7/04
USPC ........................................................ 524/401
See application file for complete search history.

(56) References Cited

U.S. PATENT DOCUMENTS

| | | | |
|---|---|---|---|
| 4,390,595 A | 6/1983 | Yamagishi | |
| 5,783,624 A * | 7/1998 | Khanarian | ............... C08K 3/40 524/442 |
| 6,399,190 B1 | 6/2002 | Myers et al. | |
| 6,548,168 B1 * | 4/2003 | Mulvaney | .............. B82Y 30/00 427/2.12 |
| 2007/0219293 A1 * | 9/2007 | Kaskel | ...................... C08F 2/44 523/333 |
| 2008/0152837 A1 * | 6/2008 | Chien | ...................... B32B 3/30 427/536 |
| 2010/0239835 A1 * | 9/2010 | Ferraro | ...................... C08J 5/18 428/220 |
| 2013/0008585 A1 | 1/2013 | Hasskerl et al. | |

OTHER PUBLICATIONS

Lamonte et al., "Cyclic Olefin Copolymers," Advanced Materials & Processes, Mar. 2001, 4 pages.
S. Krimm, "Infrared Spectra of High Polymers", Fortschr. Hochpolym.-Forsch., Bd. 2, S., 1960, pp. 51-172.
Hao-Xin Mai et al., "High-Quality Sodium Rare-Earth Fluoride Nanocrystals: Controlled Synthesis and Optical Properties", J. Am. Chem. Soc. 128, 2006, pp. 6426-6436.
Hoa-Xin Mai et al., Supporting information for ja060212h, "High-Quality Sodium Rare-Earth Fluoride Nanocrystals: Controlled Synthesis and Optical Properties", Beijing National Laboratory for Molecular Sciences, State Key Lab of Rare Earth Materials Chemistry and Applications & PKU-HKU Joint Lab in Rare Earth Materials and Bioinorganic Chemistry, Peking University, Beijing 100871, China, Electron Microscopy Laboratory, Peking University, Beijing 100871, China, (date not available) pp. S1-S13.

* cited by examiner

*Primary Examiner* — Deve V Hall
(74) *Attorney, Agent, or Firm* — MH2 Technology Law Group LLP

(57) ABSTRACT

A composition comprising a cyclic olefin copolymer; a particulate filler dispersed in the cyclic olefin copolymer; and a solvent is disclosed. The composition can be used to make a transmissive composite. The transmissive composite and a method of making a transmissive composite panel are also disclosed.

21 Claims, 2 Drawing Sheets

COMPOSITES TRANSMISSIVE TO VISUAL AND INFRARED RADIATION AND COMPOSITIONS AND METHODS FOR MAKING THE COMPOSITES

CROSS REFERENCE TO RELATED APPLICATIONS

This application is a divisional application of and claims priority to U.S. patent application Ser. No. 14/807,874, filed on Jul. 23, 2015, now U.S. Pat. No. 10,208,226 issued Feb. 19, 2019, the disclosure of which is incorporated herein by reference in its entirety.

DETAILED DESCRIPTION

Field of the Disclosure

The present disclosure is directed to polymeric films that are transmissive to radiation in the visual and infrared wavelengths.

Background

Modern infrared cameras operate over multiple bands in both the midwave and longwave infrared spectrums. In order to function successfully, the camera's detector surface must be enclosed in an IR transmissive window or domed enclosure. When used in service on an automotive or aerospace vehicle, the enclosure must not only be IR transmissive but be able to withstand considerable environmental exposure in the form of temperature extremes along with high speed wind, rain, ice, dust and dirt erosion. Such conditions will rapidly degrade soft non-durable transmission windows through erosion and surface etching.

Beyond the direct needs of pure infrared systems, current advanced imaging systems look to combine detection capabilities in both the visible and IR wavelength ranges. This presents a requirement for moldable, durable window materials that are not only transparent in the IR, but also in the visible spectrum. There are relatively few pure materials with such broadband transmission and those that do exist are often ionic crystals or semiconductors typically resulting in brittle bulk material properties and significant aqueous solubility. These properties limit the material's potential for applications in which moldable, durable materials having the ability to withstand long term environmental exposure are desired.

For example, current state of the art IR transmissive windows such as germanium, $BaF_2$, ZnS, ZnSe, $CaF_2$, NaCl, KCl, Si, Saphire, MgO, $MgF_2$, PbF, LiF, GaAs, fused silica, CdTe, $AsS_3$, KBr, CsI, diamond, Thallium Bromoiodide (ThBrI), Thallium Bromochloride (ThBrCI), and Germanium Arsenic Selenide, suffer from one or more of the following issues: opacity in the visual wavelengths, brittle crystalline behavior, difficulty of making windows that are of suitable size and also visually transparent and/or being composed of hygroscopic salts. These properties often preclude their use in many environmentally challenging applications where exposure to heat, impact, and moisture are expected. The use of tougher polymeric materials for visual and IR transmissive panels is limited by the tendency of the majority of polymeric materials (e.g., polycarbonate, polystyrene, Teflon, polyethylene, and polypropylene) to display one or more of the following shortcomings: broadband IR absorbance, visual opacity, and relatively low softening temperatures.

One visually and IR transparent semiconducting material is CLEARTRAN™, made by Dow Chemical. CLEARTRAN is a specially processed ZnS window. Thus, CLEARTRAN is not a composite material but rather pure ZnS specially modified to enhance visual transparency. As a result, it is susceptible to the same limitations as traditional bulk ZnS suffers, including fragility and the inability to be processed into conformal parts.

An IR transparent polymeric material is POLYIR® made by Fresnel Technologies. POLYIR is a collection of flexible plastic materials that display good transparency in multiple IR bands. However, POLYIR materials show significant visual haze or opacity, lower maximum service temperatures and limited tolerance to sunlight and other environmental factors.

U.S. Pat. No. 4,390,595 discloses a composite sandwich structure including an IR transparent window substrate covered by a hydrocarbon layer. The window substrate is made of a IR transparent monolithic material, such as germanium, zinc sulfide, zinc selenide or silicon. While this composite material is disclosed as being resistant to moisture and oxidation, and is said to be abrasion resistant, it is limited to many of the same fundamental shortcomings as the monolithic window substrate. These shortcomings include susceptibility to cracking of the brittle IR transparent layer, inability to be adapted for complex conformal surfaces, and damage tolerance of the thin polymer layer.

Thus, there is a need in the art for materials and processes that can provide for windows or coatings having broadband transmission in both the visible and IR spectrums, while being capable of being formed in complex curved shapes and/or displaying the mechanical durability to meet environmental challenges experienced on many vehicles, or in other applications such as helmet cams or CCTVs.

SUMMARY

The present disclosure is directed to a composition. The composition comprises a cyclic olefin copolymer; a particulate filler dispersed in the cyclic olefin copolymer; and a solvent.

The present disclosure is also directed to a transmissive composite. The transmissive composite comprises a cyclic olefin copolymer matrix; and a particulate filler dispersed in the matrix. The composite is transmissive to radiation at one or more wavelengths in both the visible and infrared spectrums.

The present disclosure is further directed to a method of making a transmissive composite panel. The method comprises: i) depositing a layer of a composite mixture on a substrate, the composite mixture comprising a) a cyclic olefin copolymer, b) a particulate filler, and c) a solvent; ii) drying the layer; iii) repeating i) and ii) one or more times to form a thin film stack; and iv) heating the thin film stack at an annealing temperature and annealing pressure to consolidate the film stack into a single composite layer.

The composites of the present disclosure provide one or more of the following: a material transmissive in both visible and IR wavelength ranges; a material that demonstrates mechanical and/or thermal durability to environmental exposure to high speed wind, rain and UV; a material suitable for windows for combined visible and IR detection systems; windows of improved environmental durability with respect to temperature and/or abrasion for visible and IR detection systems; and moldable or shapeable windows for visible and IR detection systems.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

DESCRIPTION

Figure 1A:
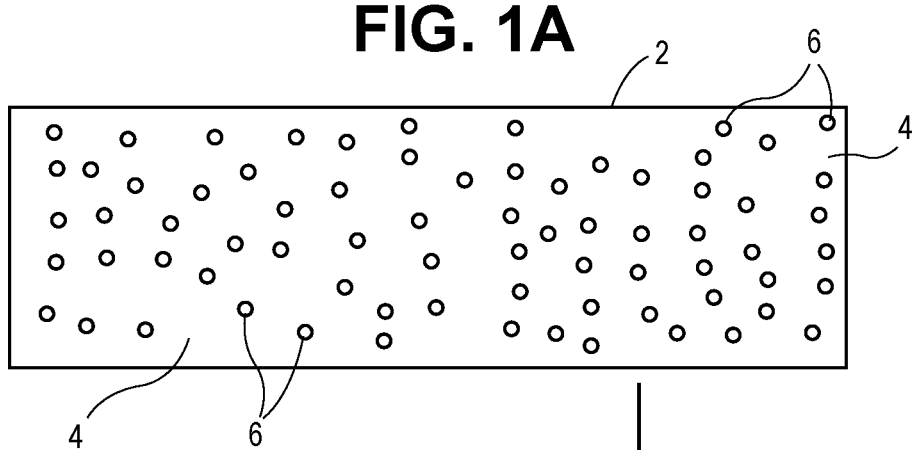
FIGS. 1A to 1D illustrate a process for making a composite window, according to an aspect of the present disclosure.
Figure 1B:
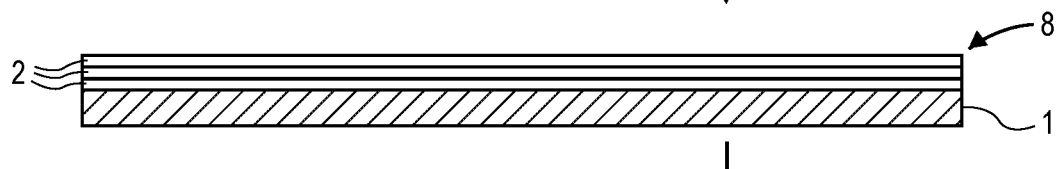

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The present disclosure is directed to a composition that is transmissive to radiation in the infrared and/or visible range of wavelengths. The composition comprises a cyclic olefin copolymer; a particulate filler dispersed in the cyclic olefin copolymer and a solvent. In addition, the composition can optionally include a plasticizing additive. The composition of the present disclosure can be used to make composite materials that are transmissive to radiation in both the visible and infrared spectrums. This can solve the problem of a lack of such materials that are capable of being formed into complex curved shapes and/or displaying the mechanical durability to meet environmental challenges, such as those experienced on many vehicles. The compositions and composites of the present disclosure are not limited to use in vehicles. Rather, they can be used in any desired application, such as known applications or applications to be developed in the future for visually transparent or translucent materials and/or IR transparent materials.

In order to realize the combined properties of high visual and IR transparency with rigid, environmentally durable mechanical properties, cyclic olefin copolymers (COC) were chosen as the matrix material of the present compositions. This class of rigid, visually transparent polymers demonstrates reduced absorption in both mid and long wave IR bands compared to many other engineering plastics. The copolymers act as the matrix component of the composite material. In addition to toughness and visual transparency, the copolymers are combined with select inorganic materials, described herein as particulate filler, to exploit their visual and IR transmissive properties. This composite structure is able to mitigate the environmental limitations of the particulate filler (brittleness, water absorption) through dispersal and encapsulation in a continuous polymeric matrix that itself possesses high visual and IR transparency relative to commercially available materials. In addition, the copolymers employed as the polymeric matrix are thermoplastic polymers, which allow for shaping or molding through thermoforming of the material over complex, conformal surfaces. Many conventional transparent materials are difficult or impossible to shape in such a way.

Suitable COCs include copolymers made by combining at least one cyclic olefin and at least one unsaturated, linear or branched olefin, where the combination results in a transmissive (e.g., translucent or transparent) copolymer. Examples of suitable cyclic olefin monomers include Norbornene, Dicyclopentadiene, Styrene, Cyclohexadiene, Vinyl norbornene, Norbornadiene, and Cyclopentene. Examples of suitable unsaturated linear or branched olefin monomers include ethylene and $C^3$ to $C^{10}$ α-olefins, such as 1-pentene or 1-hexene.

In an example, the cyclic olefin copolymer comprises a copolymer of norbornene and a $C_2$ to $C_6$ alkene. The norbornene/alkene copolymer comprises about 15 mol % to about 95 mol % by weight norbornene polymer units and about 85 mol % to about 5 mol % of $C_2$ to $C_6$ alkene units (e.g., ethylene or α-olefin). The norbornene component limits backbone conformational mobility and increases the glass transition temperature, $T_g$, while the alkylene fraction reduces backbone regularity thus reducing crystallinity and improving transparency. Such norbornene-alkylene COCs are thermoplastic materials that can be processed through heat and pressure in addition to being solution cast, which provides the ability to incorporate fillers into the COC matrix and produce composite films.

In an example, the $C_2$ to $C_6$ alkene is ethylene. Copolymers of norbornene and ethylene are commercially available. An example of the structural formula of a norbornene-ethylene cyclic olefin copolymer is shown below as Formula 1:

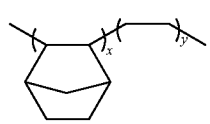

(1)

where x ranges from about 30 to about 60 mol % of norbornene polymer units and y ranges from about 40 to about 70 mol %. Examples of commercially available cyclic olefin copolymers include those available under the trade name of TOPAS™ from DAICEL CHEMICAL INDUSTRIES, LTD of Osaka, Japan, with specific products including: TOPAS 9506, TOPAS 8007, TOPAS 5013, TOPAS 6013, TOPAS 6015, and TOPAS 6017. In an embodiment, TOPAS 5013 is employed.

For purposes of IR transparency, the copolymer product is generally saturated. The resulting copolymer is also amorphous (e.g., having little or no crystallinity), which increases visual transparency. The low crystallinity is a result of the monomers being arranged randomly in the copolymer structure (e.g., a random copolymer of norbornene and ethylene).

Particulate fillers for use in the compositions of the present disclosure are selected in the nanoparticle size range and preferably exhibit high IR transparency and small particle size relative to incident radiation wavelength in order to increase IR transparency and limit scattering in both IR and visible wavelength ranges. In particular, the particulate filler material can be chosen so as to be transparent in the visual band and IR band (e.g., 4-12 μm). Beyond this, the material chosen is preferably not hygroscopic to avoid absorption of IR opaque moisture or dissolution of particles.

The particulate filler has a particle size of about 250 nm or less to reduce extinction of light due to scattering effects. Thus, the particulate filler has an average discrete particle size ranging from, for example, about 10 nm to about 250 nm. In another example, the average discrete particle size can range from about 15 nm to about 100 nm or 150 nm, such as about 20 nm to about 40 nm. The term particle size as used herein refers to discrete, individual particles rather than aggregates and is measured through direct imaging with Transmission Electron Microscopy (TEM).

Suitable particulate fillers include at least one material chosen from, for example, germanium, $CaF_2$, NaCl, KCl, KBr, diamond, Si, CsI, MgO, $MgF_2$, LiF, $BaF_2$, Thallium Bromoiodide (ThBrI), and Thallium Bromochloride (ThBrCl) in a nanoparticle morphology size range. Any suitable techniques for making the particles can be employed, such as liquid or gas phase synthesis. In an example, the particulate filler is an IR transparent material. In an example, the particle filler is $BaF_2$.

The particulate fillers can comprise one or more ligands attached thereto. Homogenous incorporation of nanoparticle filler into the COC matrix material is highly dependent on particle surface character. Due to the non-polar nature of the COC material and polar composition of many of the particulate filler materials, a natural incompatibility can exist that may result in aggregation of the particles and/or separation of the particles from the COC matrix material. One method for overcoming this problem is to include ligands on the particle surface. In one example, this can be accomplished by forming the particles, such as $BaF_2$ particles, in situ within a solvent medium where they can be coated upon formation with a non-polar ligand shell. The ligands formed in this manner can reduce particle aggregation and allow for improved dispersion of the particles into the COC matrix material compared to the same particles formed without the ligands. General techniques that can be used for forming particles with ligands are described in more detail in an article by Mai et al. entitled, "High quality Sodium rare-earth fluoride nanocrystals: Controlled synthesis and optical properties", *J. Am. Chem. Soc.*, 2006, 128 (19), pp 6426-6436. Any other suitable techniques for forming particles with ligands may also be employed. Given the teachings of the present application, making $BaF_2$ particles having suitable ligands attached to the surface would be within the ordinary skill of the art.

Ligand shell character can be chosen so as not to minimize absorption bands in selected regions of desired IR transparency (4-12 μm). One of the few ligands that meet these requirements are thiols having a hydrocarbon moiety (e.g., —RSH, where R is a saturated or unsaturated, linear, branched or cyclic hydrocarbon). Examples of suitable thiol ligands include alkyl thiols and aryl thiols.

Candidates for alkane thiol and aryl thiol ligands include but are not limited to: dodecanethiol, hexanethiol, octanethiol, decanethiol, octadecanethiol, cyclohexanethiol, cyclopentanethiol, benzene mercaptan, and benzyl mercaptan ligands. Alkane thiol ligands and techniques for making particles with these ligands are generally known in the art for certain particulates, such as ZnS. Other possible ligands include saturated and unsaturated alkyl amines, such as oleyl amine, and saturated and unsaturated alkyl carboxylic acids, such as oleic acid.

The particulate fillers are uniformly dispersed throughout the copolymer matrix to form the composite, so that the majority (e.g., greater than 50% by weight, such as 80%, 90% or 95% more by weight) of the particular filler is completely surrounded (e.g., encapsulated) by copolymer matrix. The particulate fillers in the compositions of the present disclosure can be in any suitable amount. Examples include amounts ranging from about 5% by weight to about 95% by weight, such as about 10% by weight to about 95% by weight, 25% by weight to about 95% by weight or about 30% by weight to about 95% by weight, based on the total dry weight of the composition (weight of composition minus the solvent), or the total weight of the composite for dried composites. IR absorption is generally expected to drop and transparency improve with increased filler concentration.

Plasticizing additives are optionally included in the compositions of the present disclosure. Any suitable plasticizing additive can be employed. For example, the plasticizing additive can be at least one compound chosen from an unsaturated hydrocarbon and a copolymer of ethylene and propylene. The plasticizing additive does not react or chemically bond with the copolymer, but rather remains intimately mixed with the polymer after processing, which may include, for example, hot pressing, spray coating or other film forming techniques.

Any suitable solvent can be employed. The purpose of the solvent is to solubilize COC polymer matrix and disperse the particulate filler. Examples of suitable solvents include: Xylenes, Toluene, Cyclohexane, and mixtures thereof. Solids concentration in the wet compositions of the present disclosure can range from about 5% by weight to about 50% by weight, with the solvent concentration ranging from about 50% by weight to about 95% by weight, relative to the total weight of the composition.

The composition comprising a solvent as described herein can be mixed and/or stored in a liquid form. The liquid composition can be deposited and dried to form a solid composite. The dried composite includes a cyclic olefin copolymer matrix and the above described particulate fillers dispersed in the matrix, as well as optional plasticizer, if employed. The composite can be transmissive at the desired wavelengths (e.g., translucent or transparent at one or more visual wavelengths and/or transparent at one or more infrared wavelengths).

The present disclosure is also directed to a method of making a transmissive composite panel using the compositions of the present disclosure. Referring to FIGS. 1A to 1D, the method comprises depositing a layer 2 of a composite mixture on a substrate 1, the composite mixture comprising a) a cyclic olefin copolymer, b) a particulate filler, c) an optional plasticizing additive, and d) a solvent. Substrate 1 can be made from a transparent material, such as a polycarbonate. Alternatively, substrate 1 can be made from a material that is not transparent. Any suitable technique can be used to deposit the layers 2. For example, the deposition can be is performed by either spray coating or casting. Other liquid deposition techniques can also be employed.

The deposited layer 2 is dried. A top view of a deposited layer 2 comprising a cyclic olefin copolymer matrix 4 having particulate filler 6 dispersed therein is shown in FIG. 1A. The dried layer 2 is optionally removed from the substrate 1. The depositing and drying to form each individual layer 2 and the optional removing steps are repeated one or more times to provide a film 8 with a desired thickness.

Figure 1C:

If the individual dried layers 2 are removed from the substrate after each drying step, the resulting freestanding dried films can be stacked to form a thin film stack 8 of multiple layers 2 to a desired thickness, as shown in FIG. 1C. Then the thin film stack 8 is heated at a desired annealing temperature and annealing pressure to consolidate the film stack into a single composite layer. The annealing temperature can be any suitable temperature. For example the temperature can range from about 80° C. to about 160° C. The annealing pressure can be any suitable pressure, such as, for example, from about 50 psi to 5000 psi. In this manner, the multiple dried layers 2 can be stacked and consolidated to form a free standing film 8 that does not include an additional transparent substrate.

Optionally, the dried layers 2 can be stacked on a second, transparent substrate (not shown), such as a polycarbonate or any other suitable substrate that can become part of the stack. In this manner, the multiple dried layers 2 can be stacked and consolidated with the transparent substrate.

Alternatively, if the individual layers 2 are not removed after each drying step, the deposited layers can steadily build up the film to any desired film thickness on the substrate 1 on which the film is deposited. Since depositing the layers together may result in sufficient adhesion between the separately deposited layer thicknesses without further processing, it may or may not be desired to carry out the final anneal at elevated temperatures and/or pressures. After the desired thickness is achieved, the film can optionally be removed from substrate 1.

Figure 1D:
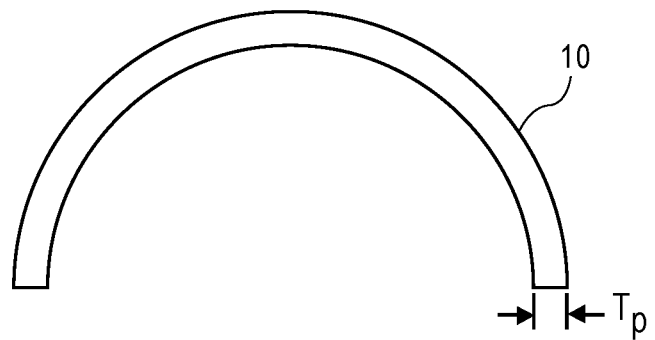
Figure 2:
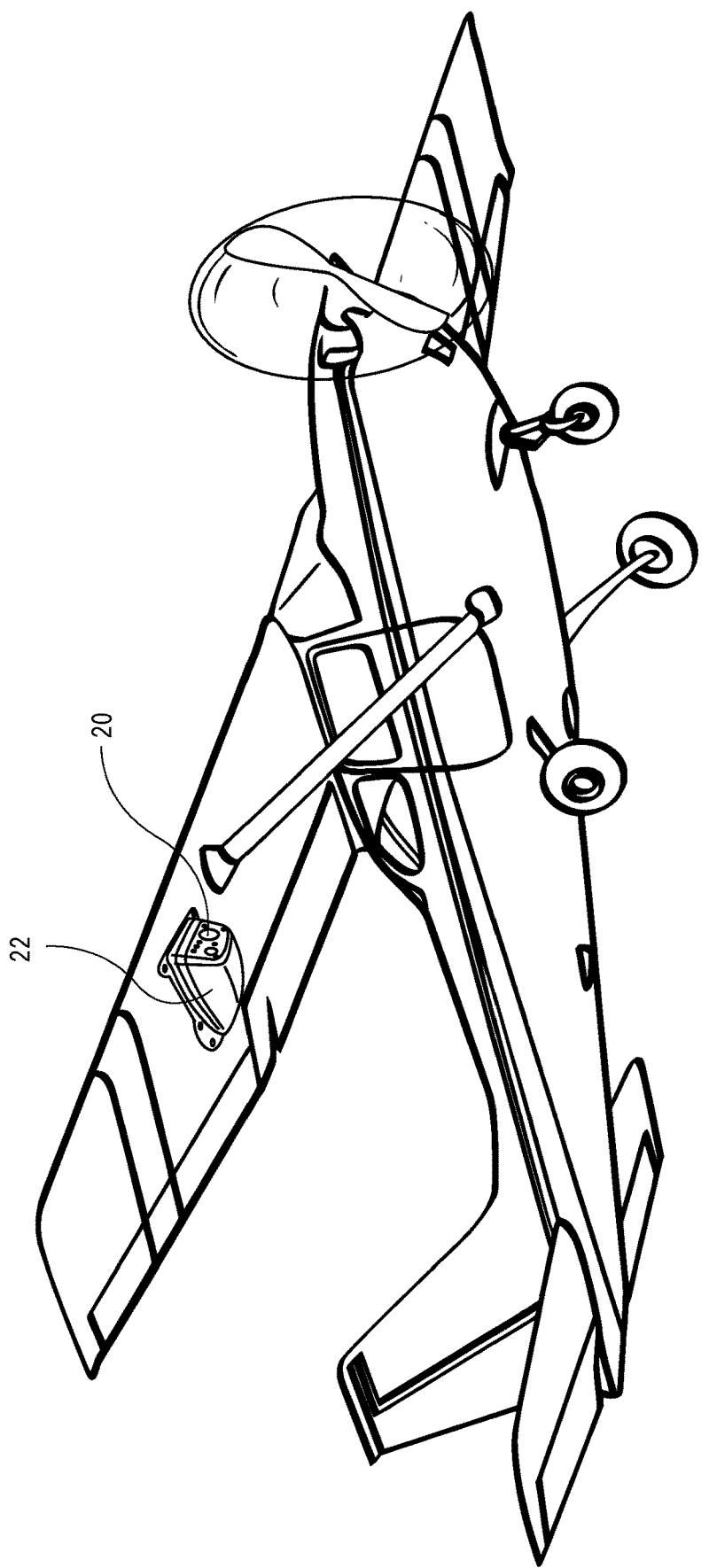
FIG. 2 illustrates a transmissive covering for an infrared camera on a vehicle, according to an aspect of the present disclosure It should be noted that some details of the figures have been simplified and are drawn to facilitate understanding rather than to maintain strict structural accuracy, detail, and scale.

The resulting free standing film or the film formed or stacked on the optional substrate can subsequently be molded or formed to any desired shape. FIG. 1D shows an example of a resulting transmissive composite in the form of a free-standing panel 10 that has been molded to a desired shape. The panel can have any desired shape and thickness, $T_p$. Thicknesses can range, for example, from about 5 microns to about 1 mm, such as about 50 microns to about 250 microns. The panel can be transmissive at the desired wavelengths (e.g., translucent or transparent at one or more visual wavelengths and/or transparent at one or more infrared wavelengths). The transmissive composite can be used for any suitable application in which visual and/or IR transmissive materials are desirable. One example of such an application is as a window or other transparent covering, such as a lense cover 20, for an infrared camera 22 positioned on a vehicle.

In an example, the composite panels display broadband transparency across both visual and portions of the infrared (such as, for example, the 4-12 micron region). In one example, the panel is transparent to visible radiation and IR radiation having wavelengths ranging from about 400 nm to about 12 microns, except for the range of about 3 microns to about 4 microns, which is the absorbing region of the cyclic olefin copolymer.

In addition to the ability to transmit radiation at the disclosed wavelengths (e.g., transparency or translucency), the material properties of the panels include one or more of: an environmental robustness with rigidity (e.g., Storage Modulus ranging from about 0.25 GPa to about 10 GPa, such as greater than 0.5 GPa, or greater than 2 GPa), heat resistance (e.g., $T_g$ ranging from about 25° C. to about 350° C., such as about 120° C. to about 350° C.), or resistance to impact and cracking due to the polymeric component of the composite (e.g., impact strength ranging from about 0.3 ft-lb/inch to about 3 ft-lb/inch, as measured, for example, using the IZOD impact strength test. Storage Modulus values can be determined by DMA (Dynamic Mechanical Analysis) on TA Instruments Q-800. Due to the polymeric nature of the composite, the material can be shaped or molded to complex curved surfaces. Such material performance is unique in a free standing panel.

In order to successfully design windows that display both visible and IR transparency it is helpful to understand the factors that reduce transparency in general, which include absorption and scattering. Absorption in the visible spectrum is frequently governed by electronic band structure. A minimum requirement for visual transparency is a band gap of energy greater than the highest energy wavelength in the visible spectrum. Absorption in the IR spectrum is dominated by the interaction of electromagnetic radiation with bonds between atoms giving rise to vibration and rotations leading to characteristic absorption frequencies.

In addition, scattering of visible and IR wavelengths in the bulk of a material is governed by changes in the index of refraction through the medium. Variations in index at length scales near the wavelength of the propagating radiation will tend to scatter those wavelengths more effectively (Mie scattering). As a result, for materials transparent to both visible and IR radiation, it is desirable to have index of refraction variation in the material below the shortest wavelength of propagating radiation. For example, this could be about 400 nm (the short end of the visible spectrum), which corresponds to length scales of less than about 150 nm and preferably less than 50 nm.

Finally the surface properties of a material will also influence scattering properties. If the material shows a surface roughness on the length scale of incident radiation, this will strongly promote diffuse scattering of light at the surface, also reducing transmission and transparency. As a result, it is desirable for windows to be both smooth and compositionally homogeneous at length scales at or above the wavelengths of interest.

Composites formed using compositions of the present disclosure can have the property of exhibiting greater than 70% average, regular transmission, such as an average, regular transmission of 70% to 99%, where incident radiation is normal (perpendicular) to the panel surface and where average transmission is determined across a wavelength band of 400 nm to 700 nm and for panel thicknesses ranging from 0.001 inch (1 mil) to 0.050 inch (50 mil). As an example of a transmission value for a given wavelength and thickness, the transmissive composite can have a greater than 70% average, regular transmission, where the incident radiation is normal to the surface and has a wavelength of 500 nm at a composite thickness of 0.001 inch. Transmission is calculated as $I(t)/I_0$ at a given panel thickness as determined, for example, using a Perkin Elmer UV/VIS spectrometer, where $I_0$ is the incident intensity and $I(t)$ is the intensity as a function of thickness. It is noted that one of ordinary skill in the art will understand that transmission generally can include regular transmission and diffuse transmission, both of which can contribute to total transmission. The average visual transmission values in the present application include only regular transmission.

Transmission characteristics in the infrared range can be quantified as absorption coefficient values. For example, the composites can have an average absorption coefficient of less than $\alpha=75$ cm$^{-1}$ at wavelengths between 8000 nm to 12000 nm. The absorption coefficient can be determined using the following relationship:

$$\alpha = \frac{4\pi k}{\lambda}$$

Complex index of refraction=$n+ik$ where α is the absorption coefficient, λ is the wavelength, and k is the imaginary portion of the complex index of refraction (n+ik). Both reflectance and transmission values for determining absorption coefficient at infrared wavelengths of 2.5 microns to 25 microns were collected using an SOC-100 Hemispherical Directional Reflectometer. The reflection and transmission values were used to determine the complex refractive index of the material using the Kramers-Kronig relationship. From the k value of the complex refractive index, the absorption coefficient (intrinsic attenuation within the material measured in per cm) was calculated. For each wavelength measured within the SOC-100, an alpha value was determined. From these values an average alpha value was calculated for the infrared waveband of 8000 nm to 12000 nm. For example, alpha values can be determined at 1000 nm increments from 8000 nm to 12000 nm and the values averaged to arrive at an average absorption coefficient.

In an example, the compositions, composites and IR transmissive panels of the present disclosure do not include significant amounts of silicone based materials; or polymers or other materials that are not transparent to IR, such as polycarbonate, polystyrene, Teflon, polyethylene, and polypropylene. The term "significant amounts" as used herein is defined to mean 1% by weight or more (e.g., 1% to 100% by weight). In examples, the compositions, composites and panels can contain less than 0.5% by weight or 0.01% by weight or less (e.g., 0.5% to 0% by weight), such as none, of the materials listed in this paragraph.

In an example, no other ingredients are added to the compositions of the present disclosure except for a cyclic olefin copolymer, one or more particulate fillers (e.g., IR transparent fillers) dispersed in the cyclic olefin copolymer and optionally a solvent and/or plasticizing additive, as described herein. In an example, the dried composites, such as the panels, of the present disclosure do not include any other ingredients except for a cyclic olefin copolymer matrix as formed by reaction of the disclosed monomers (which matrix may include the COCs and, for example, non-reacted monomers and/or unintended residual products formed by side reaction of the monomers and/or residual impurities introduced in the monomer reactants); one or more particulate fillers dispersed in the cyclic olefin copolymer and optionally a plasticizing additive and/or residual solvent, as described herein. Alternatively, the compositions and composites can include one or more additional ingredients other than those described herein, where the additional ingredients do not substantially affect the visual and/or IR transmissive qualities (e.g., transparency or translucency) of the resulting films.

EXAMPLES

The TOPAS™ COC copolymer used in the following examples was purchased from DAICEL. All other chemicals were purchased from Sigma-Aldrich and used as received.

Example 1—Solution Based Synthesis of $BaF_2$

Two microemulsions were prepared by the addition of cetyltrimethylammonium bromide (6.0 g) and 2-octanol (60 g) in separate plastic mixer cups and magnetically stirred for 1 h until fully dispersed. To create a barium microemulsion, barium nitrate (1.059 g, 4.05 mmole) was dissolved in DI H2O (10 g) water by applying heat and vortexing repeatedly, and then slowly added to one of the microemulsions by pipetting. In the same way, a fluoride microemulsion was prepared by dissolving ammonium fluoride (0.75 g, 20.3 mmole) in DI H2O (10 g) and added slowly to the other microemulsion. The two separate microemulsions were magnetically stirred for 2 h. The fluoride microemulsion was then poured into the barium microemulsion and the combined solution magnetically stirred for 10 min. The mixture was added to plastic centrifuge tubes (balanced) and spun down at 4000 RPM for 15 min. The mother liquor was poured off carefully into a sodium hydroxide solution. Absolute ethanol (5 ml) was added to each tube and each tube was vortexed to disperse the nanoparticles. The tubes were then centrifuged at 4000 rpm for 5 min. The mother liquor was carefully decanted into a sodium hydroxide solution. This process was repeated 3 more times with decreasing concentration of ethanol in a tert-butanol mixture. The subsequent 5 ml additions of liquid were comprised of 50:50 by weight ethanol and t-butanol, 75:25 by weight t-butanol and ethanol, and finally pure t-butanol. The resulting material was suspended in t-butanol in a tared container, frozen in liquid nitrogen, then t-butanol was removed by sublimation to afford a fluffy white powder (Yield=666 mg, 94% yield of $BaF_2$).

Example 2—Spray Deposition of Cyclic Olefin Copolymer (COC)

Stock solution (25% by weight COC) of cyclic olefin copolymer was prepared by adding Toluene (3 g, 32.6 mmole), cyclohexane (27 g, 0.32 mol), and 0.4 g Paraffin oil to a glass jar in a heated silicone bath (60° C.) and set stirring with a magnetic stir bar. Cyclic olefin copolymer (10 g) (TOPAS 5013) was added in 1 g increments over a period of an hour to the glass jar. The solution was set to stir over 3 hours after the last addition of polymer.

To prepare the spray coating solution of 5% by weight COC, xylene (12.8 g) and 3.2 g of stock solution were added to a glass jar and vortexed. To this solution, barium fluoride was added (0.4 g) such that the weight would be equal to 33% by mass in the dried COC—$BaF_2$ product and homogenized in a centrifugal mixer (Flacktek, DA-600).

The 16 g spray coating solution was spray deposited at 35 psi with an Iwata HP-BC airbrush connected to an Iwata Smart Jet air compressor. The substrate sprayed onto was a 75 mm×50 mm glass slide heated to 110° C. Sample flow was set to a slow rate to form thin coatings on the glass. While spraying sample, the airbrush was passed in vertical lines over the substrate, and the airbrush was shifted horizontally after each pass. Once an entire coat had been sprayed onto the substrate (~3-5 sec per coat), the substrate was left to sit for 10-15 seconds while solvent flashed off the slide. Spray coating was completed when an entire 16 g sample of coating solution was sprayed onto the slide. After removal from the hotplate, the COC film was quickly removed from the glass using a steel razor blade. Any edges that wrapped onto the sides of the glass were removed so that the product was a flat, 5mil film of 33% by weight $BaF_2$ in COC.

Example 3—Hot Pressing of COC—$BaF_2$ Film onto Polycarbonate

After drying for 10 minutes at room temperature, the COC—$BaF_2$ film was wiped clean with a kimwipe, and placed onto a clean sheet of 20 mil thick polycarbonate (100 mm×75 mm). These sheets were then sandwiched between 2 optically flat metal plates and compressed to 2000 lbs pressure in a pneumatic press. The press was then heated to 130° C. Once the desired temperature was reached, the sample was left to press for 15 minutes after which the press was rapidly cooled down to 60° C. and the pressure was released. The finished sample was then removed from the press.

Example 4—25 wt % BaF$_2$ in COC

Topas™ 5013 was purchased from Topas Advanced Polymers for this example. BaF$_2$ nanoparticles for this example included ligands attached thereto to reduce agglomeration and were provided by Intelligent Material Solutions, Inc., of Princeton, N.J.

A 25% by wt. solution of Topas™ 5013 (COC polymer) was prepared with cyclohexane and toluene as the solvents. A 40 g solution was made by weighing cyclohexane (27.03 g), toluene (3.24 g), and paraffin oil (0.41 g) into a glass container and putting it into an oil bath heated to 60° C. The organic solvent solution was set to stir, and then 10 g of COC polymer was transferred into the solution in 2 g batches over a period of five hours. The solution was then set to stir over night at 50° C. to achieve homogeneity.

To mix in the BaF$_2$ nanoparticles, a 1.44 g aliquot of the COC polymer solution was weighed into a glass container. A sample of BaF$_2$ nanoparticles (30 mg) weighing 25% total weight compared to dry COC (120 mg) was placed into the COC polymer solution. The sample was homogenized using a mechanical shaker for 15 minutes. This mixture was cast out onto a clean, flat glass plate using a doctor blade at 15 mil thickness before being left to dry overnight.

Once dry, the sample was taken to a hot press to be evenly flattened. The COC sample was placed between two 5 mil thick PET sheets and this layer sandwiched between two cleaned 0.5 mm thick plates of stainless steel. The hot press was then turned on and set to 120° C. After the press reached temperature, the press was set to 2000 lbs pressure and compressed for 15 minutes. The press was then cooled and the sample was removed at 77° C. After the first press, the sample was flattened to 3-4 mil thick. The sample was then cut into several pieces and stacked to 15 mil thick. The stack was placed back into the hot press and the pressing process was repeated so that a 3.3 mil thick sample was obtained. A 3.3 mil thick film gave an average visible transmission of 88.2% and an average a value of 53.7 cm$^{-1}$ for wavelengths ranging from 8 to 12 microns.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A composition, comprising:
   a cyclic olefin copolymer,
   a particulate filler dispersed in the cyclic olefin copolymer, the particulate filler comprising at least one material chosen from germanium, CaF$_2$, NaCl, KCl, KBr, diamond, Si, Caesium Iodide (CsI), MgO, MgF$_2$, LiF, BaF$_2$, Thallium Bromoiodide (ThBrI), and Thallium Bromochloride (ThBrCl), the particulate filler including a ligand shell made from one or more ligands attached to the particulate filler, the one or more ligands being chosen from alkyl amines, alkyl carboxylic acids and RSH, where R is a saturated or unsaturated, linear, branched or cyclic hydrocarbon moiety; and
   a solvent.

2. The composition of claim 1, wherein the cyclic olefin copolymer is a copolymer of at least one cyclic olefin and at least one unsaturated, linear or branched olefin, wherein the at least one cyclic olefin is a monomer chosen from Norbornene, Dicyclopentadiene, Styrene, Cyclohexadiene, Vinyl norbornene, Norbornadiene, and Cyclopentene; and the at least one unsaturated, linear, or branched olefin is a monomer chosen from ethylene and C$^3$ to C$^{10}$ α-olefins.

3. The composition of claim 1, wherein the cyclic olefin copolymer is a copolymer of norbornene and a C$_2$ to C$_6$ alkene.

4. The composition of claim 3, wherein the C$_2$ to C$_6$ alkene is ethylene.

5. The composition of claim 4, wherein the copolymer comprises about 30 mol % to about 60 mol % norbornene polymer units.

6. The composition of claim 1, further comprising a plasticizing additive.

7. The composition of claim 6, wherein the plasticizing additive is at least one compound chosen from an unsaturated hydrocarbon and a copolymer of ethylene and propylene.

8. The composition of claim 1, wherein the particulate filler comprises at least one material chosen from germanium, NaCl, KCl, KBr, diamond, Si, CsI, MgF$_2$, LiF, Thallium Bromoiodide (ThBrI), and Thallium Bromochloride (ThBrCl).

9. The composition of claim 1, wherein the particulate filler has an average discrete particle size ranging from about 10 nm to about 250 nm as measured by direct imaging with Transmission Electron Microscopy (TEM).

10. The composition of claim 1, wherein the particulate fillers are in an amount ranging from about 5% by weight to about 95% by weight based on the total dry weight of the composition.

11. The composition of claim 2, wherein the cyclic olefin is Norbornene and the at least one unsaturated, linear, or branched olefin is a monomer chosen from ethylene and $C^3$ to $C^{10}$ α-olefins.

12. The composition of claim 11, wherein the particulate filler comprises $BaF_2$.

13. The composition of claim 1, wherein the particulate filler comprises $BaF_2$.

14. The composition of claim 1, wherein the solvent comprises a solvent chosen from Xylenes, Toluene, Cyclohexane, and mixtures thereof.

15. The composition of claim 14, wherein the composition comprises a solids concentration ranging from about 5% by weight to about 50% by weight, with the solvent concentration ranging from about 50% by weight to about 95% by weight, relative to the total weight of the composition.

16. A composition, comprising:
a cyclic olefin copolymer;
a particulate filler dispersed in the cyclic olefin copolymer, the particulate filler comprising at least one material chosen from germanium, $CaF_2$, NaCl, KCl, KBr, diamond, Si, Caesium Iodide (CsI), MgO, $MgF_2$, LiF, $BaF_2$, Thallium Bromoiodide (ThBrI), and Thallium Bromochloride (ThBrCl);
paraffin oil; and
a solvent.

17. The composition of claim 16, wherein the particulate filler includes a ligand shell made from one or more ligands attached to the particulate filler, the one or more ligands being chosen from alkyl amines, alkyl carboxylic acids and RSH, where R is a saturated or unsaturated, linear, branched or cyclic hydrocarbon moiety.

18. The composition of claim 16, wherein the cyclic olefin copolymer is a copolymer of at least one cyclic olefin and at least one unsaturated, linear or branched olefin, wherein the at least one cyclic olefin is a monomer chosen from Norbornene, Dicyclopentadiene, Styrene, Cyclohexadiene, Vinyl norbornene, Norbornadiene, and Cyclopentene; and the at least one unsaturated, linear, or branched olefin is a monomer chosen from ethylene and $C^3$ to $C^{10}$ α-olefins.

19. The composition of claim 18, wherein the particulate filler comprises $BaF_2$.

20. The composition of claim 18, wherein the solvent comprises a solvent chosen from Xylenes, Toluene, Cyclohexane, and mixtures thereof.

21. The composition of claim 20, wherein the composition comprises a solids concentration ranging from about 5% by weight to about 50% by weight, with the solvent concentration ranging from about 50% by weight to about 95% by weight, relative to the total weight of the composition.

* * * * *